United States Patent
Ostermann et al.

(10) Patent No.: US 7,283,721 B2
(45) Date of Patent: Oct. 16, 2007

(54) METHOD AND APPARATUS FOR AUTOMATICALLY OR ELECTRONICALLY ADDRESSING DATA WITHIN A FILE OR FILES

(75) Inventors: Ralf Ostermann, Hannover (DE); Jobst Hörentrup, Hannover (DE); Uwe Janssen, Seelze (DE)

(73) Assignee: Thomson Licensing, Boulogne-Billancourt (FR)

(*) Notice: Subject to any disclaimer, the term of this patent is extended or adjusted under 35 U.S.C. 154(b) by 1065 days.

(21) Appl. No.: 10/167,819

(22) Filed: Jun. 12, 2002

(65) Prior Publication Data

US 2002/0194188 A1 Dec. 19, 2002

(30) Foreign Application Priority Data

Jun. 14, 2001 (EP) ................... 01250216

(51) Int. Cl.
*H04N 5/76* (2006.01)
*H04N 7/00* (2006.01)
*H04N 5/00* (2006.01)

(52) U.S. Cl. ........................ 386/46; 386/125
(58) Field of Classification Search .................... 386/1, 386/45–46, 125–126
See application file for complete search history.

(56) References Cited

U.S. PATENT DOCUMENTS 5,774,666 A * 6/1998 Portuesi ...................... 725/110
5,991,798 A * 11/1999 Ozaki et al. ................. 709/217
6,243,708 B1   6/2001 de Vries et al. ............. 707/102
6,580,870 B1 * 6/2003 Kanazawa et al. ............ 386/95

OTHER PUBLICATIONS

Wong et al.: "A Multimedia Presentation Toolkit for the World Wide Web" Software Practice & Experience, John Wiley & Sons Ltd., vol. 27, No. 4, Apr. 1, 1997, pp. 425-446.
European Search Report of Mar. 6, 2002.

* cited by examiner

*Primary Examiner*—Thai Q. Tran
*Assistant Examiner*—Nigar Chowdhury
(74) *Attorney, Agent, or Firm*—Joseph J. Laks; Robert D. Shedd; Paul P. Kiel

(57) ABSTRACT

Available storage media capacity will be doubling every 2 years. In 2005 it will likely be possible to store about 80 movies on a single 400 GByte hard disk. Because it is no longer possible to access specific recordings stored in a book shelf by just looking at the video cassettes or discs and some annotations on their cover, personal video or audio recording will require new ways to organise and electronically search for content, including automatic content referencing and automatic content location. According to the invention the URI string is extended by additional information that allows to locate specific information within a file that is referenced by such URI. Similar types of URI extensions are used for describing trick mode information. Such extensions take into account specific requirements of the storage format involved.

9 Claims, 1 Drawing Sheet

METHOD AND APPARATUS FOR AUTOMATICALLY OR ELECTRONICALLY ADDRESSING DATA WITHIN A FILE OR FILES

FIELD OF THE INVENTION

The invention relates to a method and to an apparatus for automatically or electronically addressing data within a file or files, which file or files are addressed using URI identifiers.

BACKGROUND OF THE INVENTION

Available storage media capacity will be doubling every 2 years. Currently it is possible to store about 20 full-length movies on a single 100 GByte hard disk. In 2005, it will likely be possible to store about 80 movies on a single 400 GByte hard disk.

Similar figures apply to optical recording: currently it is about 5 GByte on a single layer single sided disc. DVR recorders that are successors of DVD recorders use blue-violet lasers allowing storage of up to 35 GBytes on an optical disc.

SUMMARY OF THE INVENTION

Because it is no longer possible to access specific recordings stored in a book shelf by just looking at the video cassettes or discs and some annotations on their cover, personal video or audio recording will require new ways to organise and electronically search for content, including automatic content referencing and automatic content location.

One solution is the use of Metadata describing the content that is recorded on the storage media. 'Metadata' is defined as data about data. As such, Metadata is either attached to other Metadata items or to the content of multimedia bitstreams, e.g. MPEG-2 transport or program streams. Metadata that is attached to recorded content, may point to a specific point on the time axis of the recorded content or to a time period of the recorded content or to a collection of recorded content.

A problem to be solved by the invention is to provide automatic or electronic access, and in particular user-friendly access, to specific content stored or broadcast within big amounts of data.

Currently, e.g. in the Internet, content referencing information or content location information is typically encoded by a 'Uniform Resource Identifier' denoted URI (URI Specification RFC2396). URIs are the denominated successor of URLs (Uniform Resource Locator—Specification RFC1738) and URNs (Uniform Resource Name—Specification RFC2141). An URI string contains the transport protocol, the domain name or IP address of the storage device, the server port number, the logical name of the drive containing the recorded content, the path name, and the file name that contains the recorded content. Everything that describes further content referencing or content locating information within a file itself is outside the scope of the URI Specification. However, the URI specification does define some delimiter characters like "#" and "?" that allow separating the first part of a URI that is completely defined by above URI Specification from a second optional part that may contain userspecific extensions. Example URIs are:
protocol://hostname:port/path/filename
protocol://hostname:port/path/filename#extension
protocol://hostname:port/path/filename?extension A generic encoding is required to store such complete or partial content references inside the Metadata. Such encoding is also useful as a playback command that is send to a remote storage or recording device.

According to the invention the URI string is extended by additional information that allows to locate specific information within a file that is referenced by such URI. Advantageously, similar types of URI extensions are used for describing trick mode information.

Advantageously, such extensions take into account specific requirements of the storage format involved, e.g. DVR or DVD Streamer or hard disc.

The further description concentrates on URI extensions in the context of DVR, although most embodiments can easily be generalised for use in any kind of digital recording.

The invention includes the following advantages:
 It is possible to reference not only complete multimedia files, but also parts and segments in a multimedia file.
 The well-established Internet domain name service can be used to unambiguously electronically locate the content server device.
 The well-established URI coding can be used to reference a multimedia file itself.
 A simple and well-known human-readable and at the same time computer interpretable description is used.
 Multimedia content can be located and automatically delivered over the Internet.

In principle, the inventive method is suited for automatically or electronically addressing data within a file or files, which file or files are addressed using URI identifiers, wherein an URI identifier is extended using an URI delimiter character between a standard part of the URI identifier and a corresponding URI extension part, the content of said URI extension part representing a user's request for storing—or for making available access to—specific data of a file or files identified by said URI identifier standard part, wherein the URI extension part data are used to control a recording unit or a storage medium or a memory for storing a corresponding part of said file or files, or for replaying a corresponding part of said file or files.

In principle the inventive apparatus is suited for automatically or electronically addressing data within a file or files, which file or files are addressed using URI identifiers, said apparatus including:
 a recording unit or a storage medium or a memory;
 means for controlling said recording unit or storage medium or memory when storing a corresponding part of said file or files, or when replaying a corresponding part of said file or files, wherein an URI identifier is extended using an URI delimiter character between a standard part of the URI identifier and a corresponding URI extension part, the content of said URI extension part representing a user's request for storing—or for making available access to—specific data of said file or files identified by said URI identifier standard part, wherein the URI extension part data are used to control said means for controlling.

BRIEF DESCRIPTION OF THE DRAWINGS

Exemplary embodiments of the invention are described with reference to the accompanying drawing, which shows in.

DETAILED DESCRIPTION OF PREFERRED EMBODIMENTS

Figure 1:
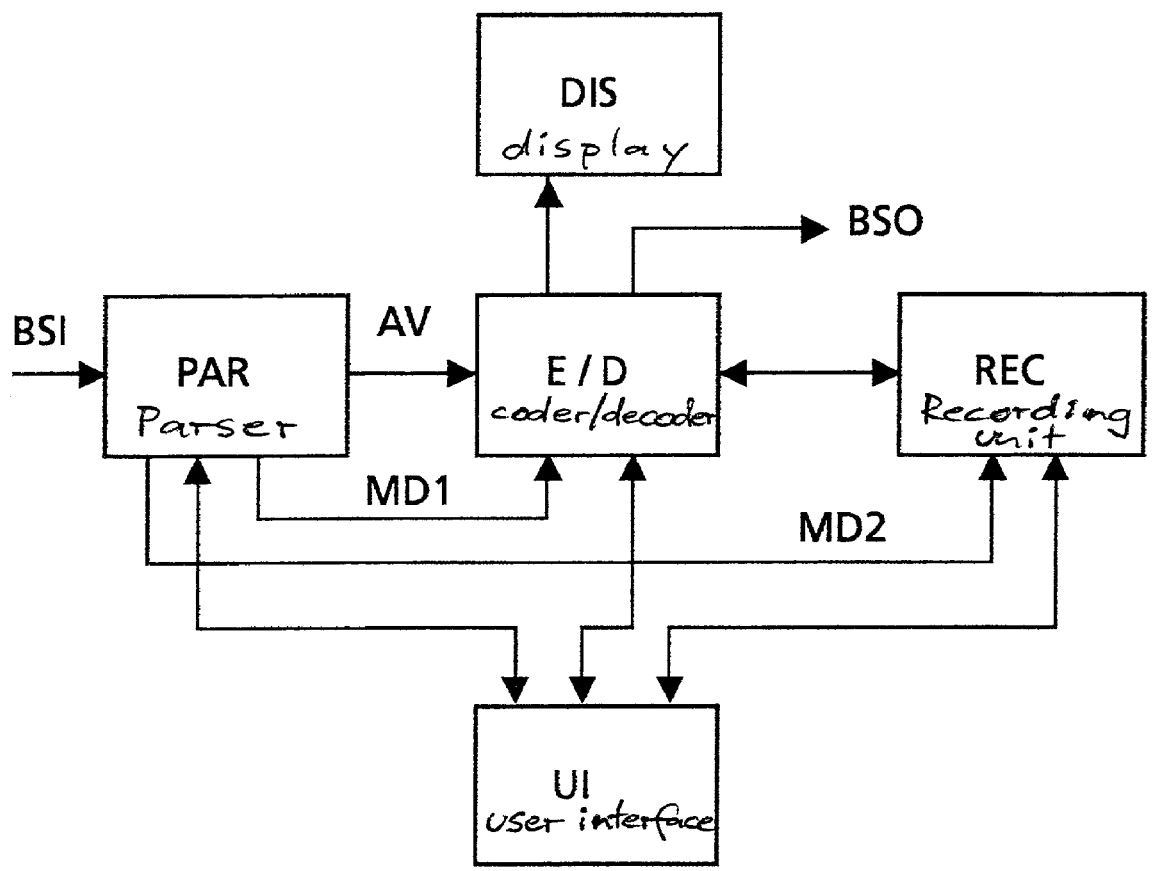
FIG. 1 inventive apparatus using URI user extensions for locating data.

In FIG. 1 an input bitstream BSI, e.g. an MPEG-2 transport or program stream or a DVB signal, enters a parser PAR. The parser is connected and/or controlled by a user interface UI, e.g. a computer. Metadata can be attached to BSI. The parser PAR detects and evaluates URIs that are attached to the Metadata of bitstream BSI.

The video and/or audio data AV contained in BSI and selected in PAR are recorded in files in a recording unit REC that may store the data on an optical disc or any other storage medium including an IC memory. Before being recorded/stored, and following replay from REC, the data may pass a data encoder or decoder E/D, respectively. The parser PAR or a respective controller unit sends the Metadata including the URI data and/or the URI extension data, which are used as references to corresponding parts of file data, to E/D via line or bus MD1 and/or to REC via line or bus MD2, according to the content of the URI extension data contained in the received Metadata. REC and/or E/D may also be separate devices. The parser may control REC and/or E/D according to the URI data or URI extension data. The Metadata including the URI and URI extension data are recorded together with the AV data in REC. When replaying, E/D can feed its output data to a display DIS or can output a bitstream BSO like bitstream BSI, or both.

In an extended embodiment, the information required for a user for attaching and/or amending user-specific URI extensions is made available to UI and/or to display DIS that may be a TV screen separate from a recorder device. The user enters the desired URI extension data into UI, or confirms that URI extensions already attached to received data are to be searched. The corresponding information or data is transferred to PAR, or controls REC and/or E/D directly.

The apparatus may also be designed such that existing URI extension data are recovered from REC and are further amended in UI.

Received URI extensions, or URI extensions input by a user, are checked and allowed or rejected by parser PAR or by user interface UI, in order to take into account specific requirements of the storage format involved, e.g. DVR or DVD Streamer or hard disc.

Inventive example URIs are:
http://localhost/00032.clpi#dvr=metaref,start_time=98989, end _time=108989
http://localhost:80/10038.clpi#dvr=playback
http://localhost/10038.m2ts#dvr=playback
http://localhost/10038.clpi#dvr=playback, trick_mode=fast_for ward_3x
http://dvr.myHome.de/00032.clpi#dvr=playback "clpi" denotes clip information, "m2ts" denotes MPEG2 Transport Stream.

In genereal, in addition to start time and/or end time, further time instants can be included in case a selected data sequence includes jumps. The various items of time information may be based on MPEG clock references.

The following list includes proposals for possible embodiments:
The multimedia content reference is described by a URI compliant string with extensions (URI extension).
The URI extension is organised as a list of URI extension attributes, where a URI extension attribute can be an attribute name plus attribute value, or a URI extension attribute can be an attribute name.

The URI extension attribute can describe:
a point on the timeline of the content.
a time period starting at some point on the timeline of the content.
a time period starting and ending at some point on the timeline of the content.
a byte offset in the content file.
a start byte offset plus some byte length in the content file.
start byte offset and end byte offset in the content file.
a trick mode that is to be applied to the content during playback.

MPEG-specific:
a selection of PIDs to be filtered out from an MPEG-2 Transport Stream.
a selection of stream_id's to be filtered out from an MPEG-1 or MPEG-2 Program Stream.

DVR-specific:
a content reference that is based on information contained in a 'Clip Information' file "xxxxx.clpi" compliant to the DVR specification, or in an 'MPEG-2 Transport Stream' file "xxxxx.m2ts" compliant to the MPEG-2 specification.
a content reference that is based on information contained in a "Real Playlist" file "yyyyy.rpls" compliant to the DVR specification.
a content reference that is based on information contained in a "Virtual Playlist" file "yyyyy.vpls" compliant to the DVR specification.

The URI extension can describe:
multimedia content on a disc compliant to the DVR specification.
multimedia content on a disc compliant to the DVD Stream Recording specification.
multimedia content on a disc compliant to the DVD Video Recording specification.
multimedia content on a disc compliant to the DVD Video specification, or any other disc format.
multimedia content within an MPEG-2 Transport Stream file or a file that acts like a container for MPEG-2 Transport Streams.
multimedia content within an MPEG-1 or MPEG-2 Program Stream file or a file that acts like a container for MPEG-1 or MPEG-2 Program Streams.
multimedia content within an MPEG-1 or MPEG-2 Elementary Stream file or a file that acts like a container for MPEG-1 or MPEG-2 Elementary Streams, or any other multimedia format.

The URI extension can be appended to:
a TV-AnyTime compliant Content Reference Identifier (CRID).
a TV-AnyTime compliant Content Locator.
an "href" attribute value in an MPEG-7 compliant descriptor.

It is also possible to specify specific attribute encodings like: dvr=metaref,start time=98989,end time=108989, in_time=x, out_time=x The URI extension part can refer or point to one or more different layers in a file structure, e.g. a in DVR file structure.

Advantageously, the proposed URI or URL extension is compatible with the current Internet requirements.

The invention is applicable to all kinds of electronic multimedia content referencing and content location, for instance in connection with DVR standardisation, Metadata, Content Referencing, Content Location, Personal Video Recorder, Personal Digital Recorder, Optical Storage, Hard Disk Storage, Home Server, and Web Enabled Storage.

What is claimed is:

1. A method for addressing data within a file using a Uniform Resource Identifier (URI), comprising: extending said URI using a delimiter character between a first part of said URI and an extension part of said URI, said extension part describing trick mode information and representing a user's request for one of storing and accessing specific data of said file identified by said first part, and using said extension part to control a memory for one of storing and replaying said specific data.

2. The method of claim 1, wherein said extension part is one of received together with a bitstream and generated according to a user's input and thereafter attached to said received bitstream, and said extension part is checked for consistency to take into account specific requirements of a storage format of said memory.

3. The method of claim 2, wherein said extension part is contained in metadata attached to said received bitstream.

4. An apparatus for addressing data within a file using a Uniform Resource Identifier (URI), said apparatus comprising:
    a recording unit; and
    means for controlling said recording unit when one of storing and replaying a corresponding part of said file, wherein: said URI is extended using a delimiter character between a standard part of said URI and an extension part of said URI, said extension part describing trick mode information and representing a user's request for one of storing and accessing specific data of said file identified by said standard part, and said extension part is used to control said means for controlling.

5. The apparatus of claim 4, wherein said extension part is one of received together with a bitstream and generated via a user interface according to a user's input and thereafter attached to said received bitstream, and said extension part is checked for consistency to take into account specific requirements of a storage format of said recording unit.

6. The apparatus of claim 5, wherein said extension part is contained in metadata attached to said received bitstream.

7. A method for addressing data within a file using a Uniform Resource Identifier (URI), said method comprising steps of:
    receiving a bitstream including metadata with said URI contained in said metadata, said URI including a delimiter character interposed between a first part of said URI and an extension part of said URI; and
    using said extension part to control a storage medium for one of storing and replaying specific data of said file wherein said extension part describes trick mode information.

8. The method of claim 7, wherein said extension part represents a user's request for one of storing and accessing said specific data.

9. A method for addressing data within a file usin a Uniform Resource Identifier URI said metho comprising steps of:
    receiving a bitstream including metadata with said URI contained in said metadata. said URI including a delimiter character interposed between a first part of said URI and an extension part of said URI; and
    using said extension part to control a storage medium for one of storing and replaying specific data of said file, wherein said extension part is checked for consistency to take into account specific requirements of a storage format of said storage medium.

* * * * *